United States Patent [19]

Gilbert

[11] Patent Number: 5,615,259
[45] Date of Patent: Mar. 25, 1997

[54] INTEGRAL FLAP HOUSING, SWITCH ACTUATOR AND DETENT MECHANISM FOR A FOLDABLE TELEPHONE

[75] Inventor: William A. Gilbert, Fort Worth, Tex.

[73] Assignee: Motorola, Inc., Schaumburg, Ill.

[21] Appl. No.: 448,928

[22] Filed: May 25, 1995

[51] Int. Cl.⁶ .................................................. H04M 1/00
[52] U.S. Cl. ............................................ 379/433; 379/434
[58] Field of Search .................................... 379/433, 428, 379/434; 455/89, 90, 128; 16/334, 341, 342, 363

[56] References Cited

U.S. PATENT DOCUMENTS

| | | | |
|---|---|---|---|
| 4,822,965 | 4/1989 | Hyogo et al. | 200/333 |
| 4,897,873 | 1/1990 | Beutler et al. | 379/433 |
| 5,117,073 | 5/1992 | Mischenko | 379/433 |
| 5,185,790 | 2/1993 | Mischenko | 379/433 |
| 5,274,882 | 1/1994 | Persson | 16/303 |

FOREIGN PATENT DOCUMENTS

WO93/18592  9/1993  WIPO.

Primary Examiner—Thomas W. Brown
Assistant Examiner—Jack Chiang
Attorney, Agent, or Firm—John G. Rauch

[57] ABSTRACT

A flap housing (14) for a foldable radiotelephone handset (10) has a hinge pin (72) with an actuator (96) for the radiotelephone activation switch (44) and a detent catch (88) integrated with the flap housing body (60). The actuator (96) engages the switch (44) to deactivate the handset (10) when the flap housing (14) is in a closed position. The detent catch (88) engages a detent stop (110) on the front housing (30) of the radiotelephone (10) when the flap housing (14) is in an open position.

10 Claims, 5 Drawing Sheets

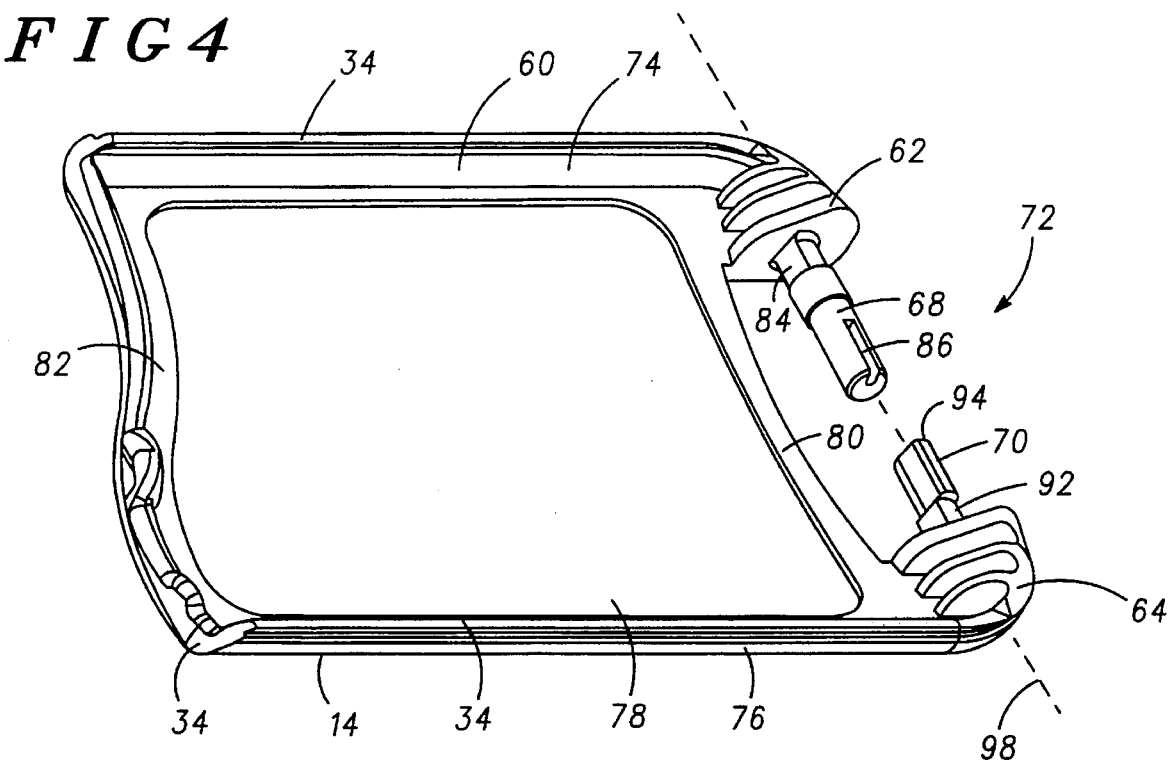
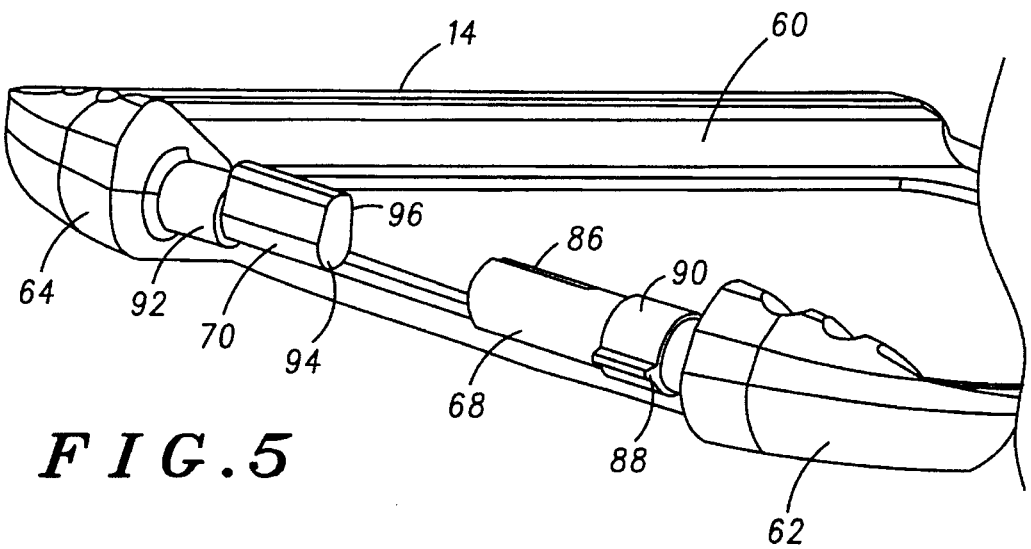

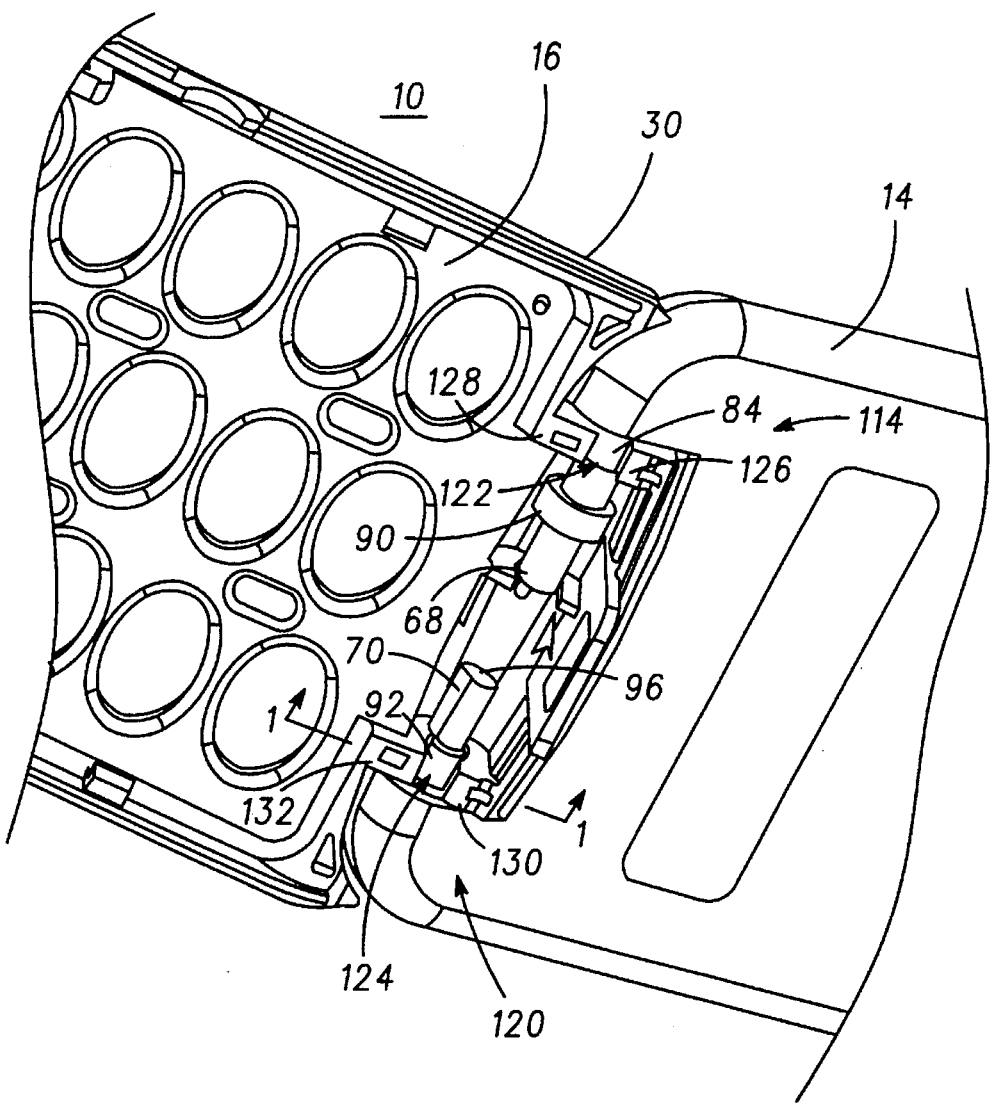
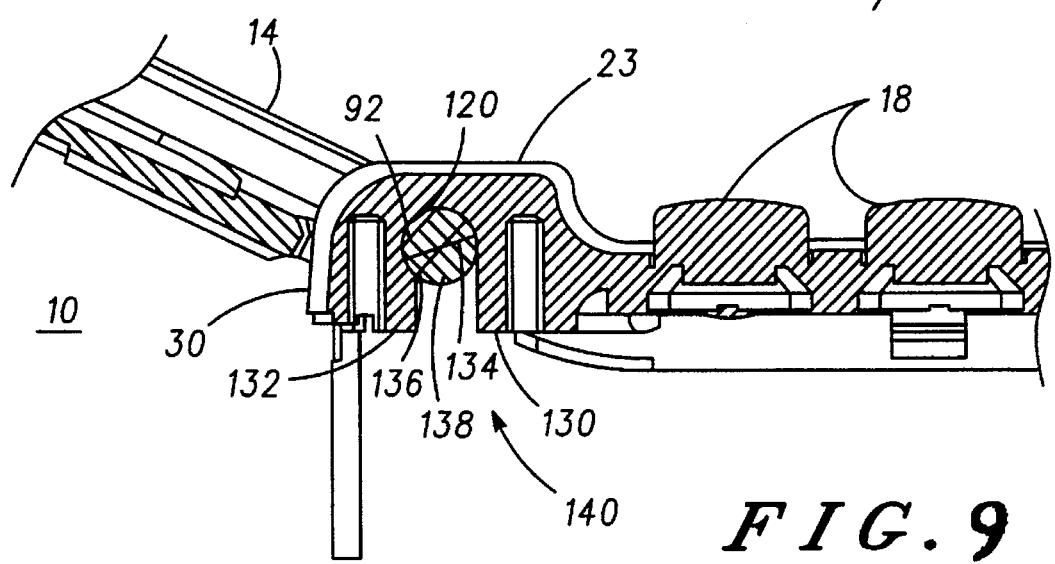

INTEGRAL FLAP HOUSING, SWITCH ACTUATOR AND DETENT MECHANISM FOR A FOLDABLE TELEPHONE

FIELD OF THE INVENTION

The present invention generally relates to radiotelephones and, more particularly, to foldable radiotelephones having a hinged housing.

BACKGROUND OF THE INVENTION

Radiotelephones permit a user to communicate over a wireless system at virtually any location. The radiotelephone communicates with a receiving station using a low voltage, radio frequency signal. At the receiving station, connections are provided to conventional telephone systems. Radiotelephones may be part of cellular telephone systems, cordless telephone systems, such as second generation cordless telephone (CT2) or other wireless telephone systems.

Radiotelephone handsets have been produced in a variety of designs. The goal of these designs is generally to reduce the physical size of the handset while retaining full functionality as well as ease of use and convenience for the user.

One type of radiotelephone handset is a foldable radiotelephone. A foldable radiotelephone generally includes two housing elements connected by a hinging mechanism. When the radiotelephone is not in use, the two housing elements may be folded to a smaller, more compact configuration while rotating the hinging mechanism.. When the radiotelephone is in use, the two housing elements may be unfolded. The two housing elements are generally called a body housing and a flap housing.

Some foldable radiotelephone handsets include a switch for activating the radiotelephone when handset is unfolded. In response to activation of the switch, the radiotelephone is placed in an off hook condition, or otherwise made ready to initiate a call. When the handset is folded, the switch is deactivated, placing the radiotelephone in a standby or on hook condition for receiving a call.

Previous handsets have used proximity detection devices, such as a reed switch and magnet, to provide the switch which activates the radiotelephone. When the handset is folded and unfolded, moving the two housing elements into and out of proximity, this motion is detected by the switch.

Such proximity detectors are relatively expensive, and add to the total parts count and manufacturing costs of the handset. Since radiotelephones are consumer devices, sales and marketing of radiotelephones are extremely sensitive to costs. Also, the relatively high parts count increases manufacturing costs as the many parts must be assembled.

Other foldable radiotelephone handsets have provided a switch having an on-off actuator which protrudes through an opening in one of the handset housing elements. As the handset is folded, the actuator is engaged by a portion of the other housing element, thereby actuating the switch.

Use of this type of switch has been limited by the need to provide an opening in the one housing element for the actuator. Such an opening admits dirt, moisture and other contaminants into the housing. Such contaminants can adversely affect the operability of the radiotelephone.

Generally, in foldable radiotelephone handsets, one housing element includes an earpiece and the housing element includes a microphone. A user holds the unfolded phone adjacent to the user's head with the earpiece proximate user's ear and the microphone proximate the user's mouth. For good acoustical performance, the flap housing must be held in an optimal position relative to the body housing of the handset. This optimal, open position generally orients the flap housing at an angle relative to the body housing.

Previous radiotelephone handsets have included a detent mechanism to maintain the flap housing in the predetermined open position. As the handset is unfolded, the detent mechanism snaps or clicks into place to locate or lock the flap housing in the predetermined open position. A small amount of pressure on the flap housing causes the detent mechanism to unlock, so the handset can be folded.

Such previous detent mechanisms have required many individual parts to implement. These parts must be assembled with the flap housing, a procedure which can be difficult and time-consuming because of the small size of some of the parts. High part count and difficulty of assembly add to the manufacturing costs of the completed radiotelephone. Accordingly, a flap housing providing a detent mechanism and a switch actuator is required to reduce manufacturing costs, as well as the finished product cost associated with a radiotelephone.

BRIEF DESCRIPTION OF THE DRAWINGS

The present invention will be better understood when read in light of the accompanying drawings in which:

FIG. 4 is a first perspective view of a flap housing for use with the cordless radiotelephone handset of FIG. 1;

FIG. 5 is a second perspective view of a portion of the flap housing of FIG. 4;

FIG. 8 is a perspective view of the cordless radiotelephone handset of FIG. 1 in which a portion of the handset has been; and FIG. 9 is a second cross-sectional view of the cordless radiotelephone handset of FIG. 1 with the flap housing in its open position.

DETAILED DESCRIPTION OF THE PREFERRED EMBODIMENT

Figures 1, 3:
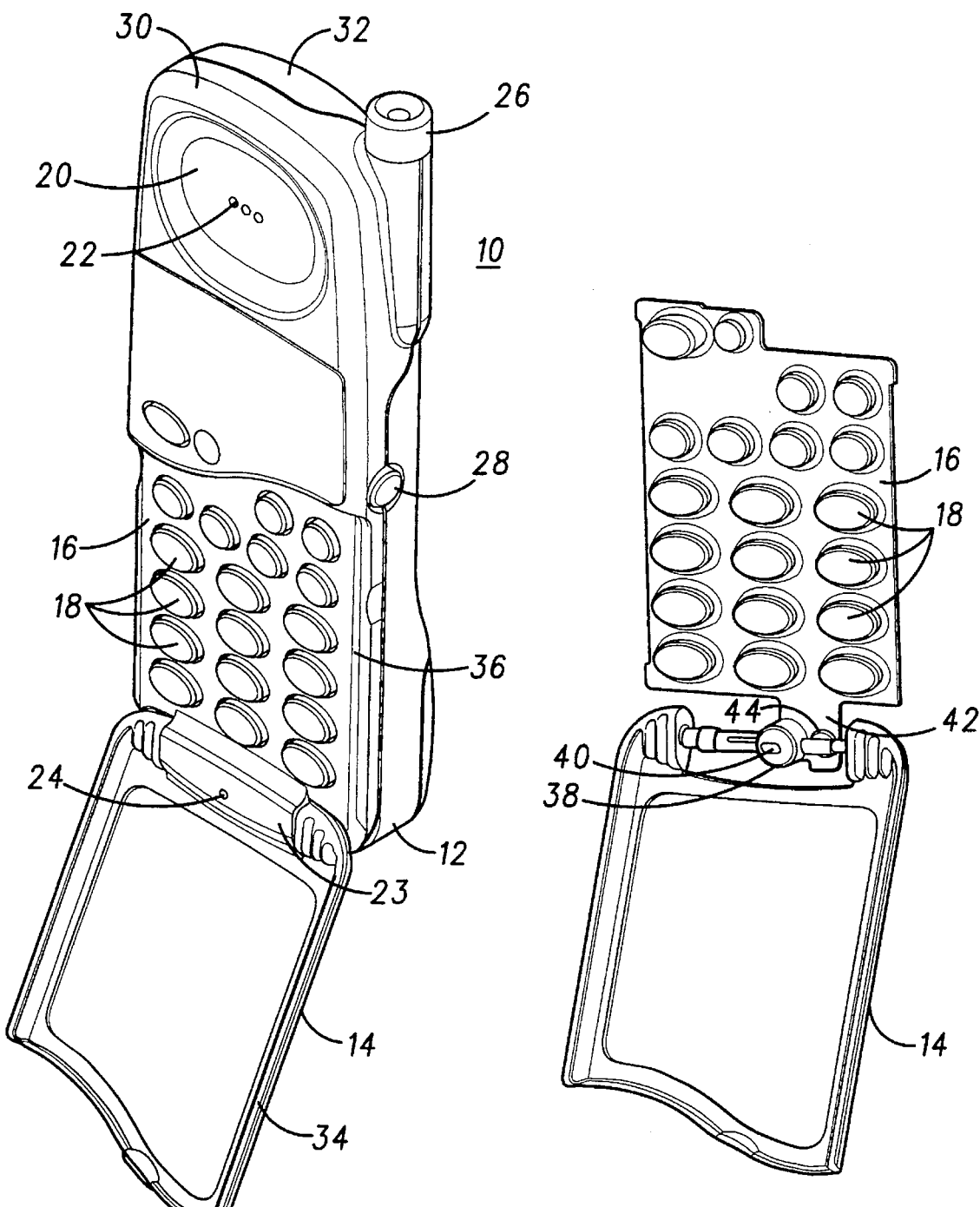
FIG. 1 is a perspective view of a cordless radiotelephone handset.
FIG. 3 is a perspective view of the cordless radiotelephone handset of FIG. 1 in which a portion of the handset has been removed.

Referring now to FIG. 1, it is a perspective view of a cordless radiotelephone handset 10 constructed in accordance with the present invention. The handset 10 includes a first or body housing 12 and a second or flap housing 14. The body housing 12 includes a keypad 16 including a plurality of keys 18 for operating the handset, an earcup 20 including earpiece openings 22 providing access to an earpiece (not shown). The body housing 12 further includes a hinge cover 23 having a microphone opening 24 which provides access to a microphone (not shown). The body housing 12 still further includes an antenna 26 which may be extended for transmission and reception of radio frequency (RF) signals.

The body housing 12 still further includes a flap release button 28. The body housing 12 preferably includes a front housing portion 30 and a rear housing portion 32 which may be joined to the front housing portion 30 by screws, snap fitting or by any other appropriate method.

Figure 2:
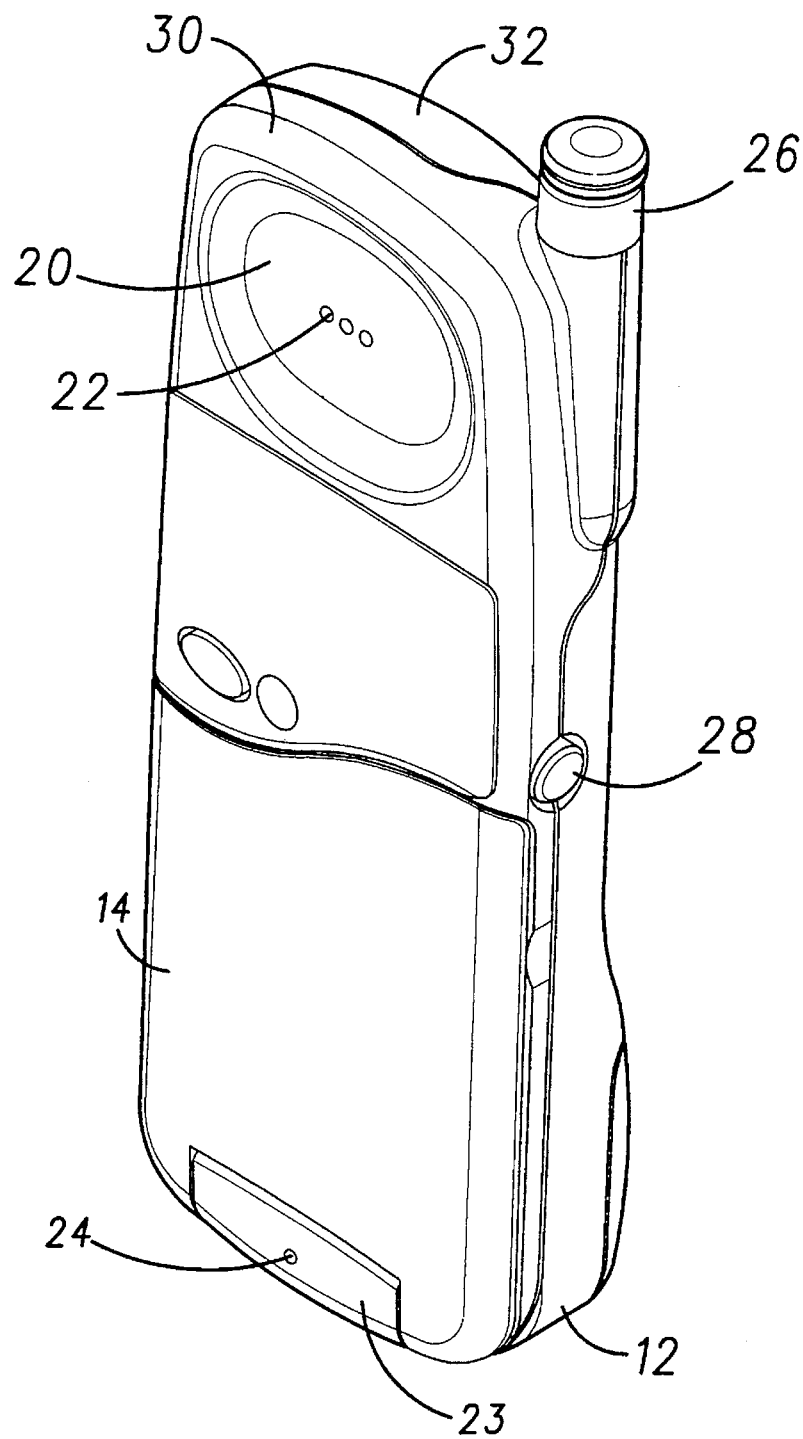
FIG. 2 is a second perspective view of the cordless radiotelephone handset of FIG. 1.

FIG. 2 is a second perspective view of the cordless radiotelephone handset 10 of FIG. 1. The flap housing 14 may be moved between a first or closed position illustrated in FIG. 2 and a second or open position illustrated in FIG. 1. The flap housing 14 has a flap perimeter 34 (FIG. 1) which engages a front housing perimeter 36 on the body housing 12 when the flap housing 14 is in the closed position. In the closed position, the flap housing 34 serves as a cover for the keypad 16 to prevent unintentional or inadvertent actuation of one or more of the keys 18.

As is illustrated in FIG. 1, when the flap housing 14 is in the open position, the flap housing 14 is preferably maintained at an angle relative to the body housing. The handset 10 preferably includes a bias element (not shown) such as a coil spring for biasing the flap housing 14 in the open position when the flap release button 28 is depressed. Depressing the flap release button 28 releases a catch element (not shown) allowing the bias element to rotate the flap housing 14 from the closed position to the open position.

Referring now to FIG. 3, it is a perspective view of the cordless radiotelephone handset 10 of FIG. 1 in which a portion of the handset 10 has been removed to better illustrate aspects of the handset 10. FIG. 4 shows the flap housing 14 disposed in the open position in relation to the keypad 16. As can be seen in FIG. 4, the keypad 16 includes an extended portion 42. Disposed on the extended portion 42 of the keypad 16 are a microphone boot 38 and a switch 44. The microphone boot 38 includes a microphone element 40 which operates as a microphone for the handset 10.

The switch 44 preferably operates to activate the radiotelephone handset 10. When the switch 44 is depressed, the handset 10 is inactivated and placed in a standby mode for receiving calls. When the switch 44 is released, the handset 10 is preferably activated and placed in active mode for initiating an outgoing telephone call or answering an incoming telephone call. As will be discussed in further detail below, the flap housing 14 includes an actuator which actuates the switch 44 when the flap housing is moved between the open position (illustrated in FIG. 1) and the closed position (illustrated in FIG. 2).

FIG. 4 is a first perspective view of a flap housing 14 for use with the cordless radiotelephone handset 10 of FIG. 1 and constructed in accordance with the present invention. FIG. 5 is a second perspective view of a portion of the flap housing 14 of FIG. 4. The flap housing 14 includes a body 60, a first hinge portion 62, and a second hinge portion 64. Body 60, first hinge portion 62, and second hinge portion 64 are preferably integrally formed, such as by injection molding of flap housing 14. Integral forming reduces the overall parts count and simplifies manufacturing, reducing costs for the handset 10.

The first hinge portion 62 terminates in a first hinge pin or hinge pin portion 68. The second hinge portion 64 terminates in a second hinge pin or hinge pin portion 70. Together, the first hinge pin 68 and the second hinge pin 70 form a hinge pin 72. Hinge pin 72 is shown separated into two segments, first hinge pin 68 and second hinge pin 70, in order to provide clearance for microphone boot 38 (FIG. 3). However, as will be recognized by those ordinarily skilled in the art, hinge pin 72 could consist of a single hinge pin segment.

The body 16 of flap housing 14 includes a first side piece 74, second side piece 76 and flap cover 78. The body 16 of flap housing 14 further includes a first end piece 80 and a second piece 82. Surfaces of the first side piece 74, the second end piece 82 and the second side piece 76 define the flap perimeter 34.

The first hinge pin 68 includes a D-shaped portion 84, a slot 86 (FIG. and actuator or detent catch 88 (FIG. 5) as illustrated in FIGS. 4 and 5, the portion of the first hinge pin 68 including the detent catch 88 is reinforced by a collar 90, which is preferably integral with the first hinge pin 68. However, inclusion of this reinforcing collar 90 is optional.

The second hinge pin 70 includes a D-shaped portion or segment 92, and a cam-shaped segment or actuator 94. As will be discussed further in conjunction with FIG. 6, the cam-shaped segment 94 provides an actuator 96 for actuating the switch 44 (FIG. 3). While the actuator 96 is illustrated in FIG. 5 as being cam-shaped, any shape suitable for actuating the switch 44 may be used.

The first hinge pin 68 and the second hinge pin 70 are preferably aligned on a common axis 98 when assembled in conjunction with the body housing 12. The flap housing 14 may be rotated about this axis 98 between the first or closed position and the second or open position.

Figure 6:
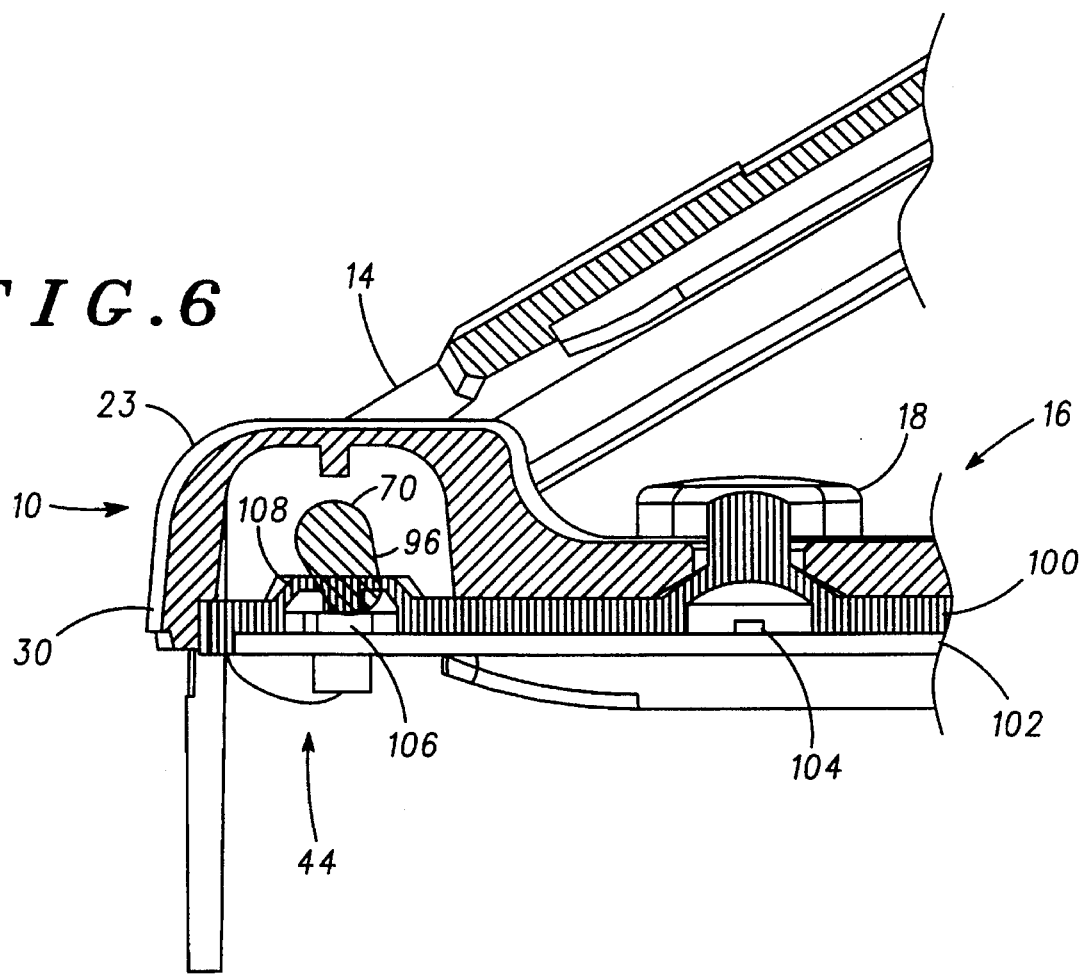
FIG. 6 is a cross-sectional view of the cordless radiotelephone handset of FIG. 1 with the flap housing partially closed.

FIG. 6 is a cross-sectional view of the cordless radiotelephone handset 10 of FIG. 1. In FIG. 6, the flap housing 14 is illustrated in a partially closed position relative to the front housing portion 30.

As is illustrated in FIG. 6, the keypad 16 includes an elastomeric layer 100 fabricated of material such as silicone rubber disposed upon a rigid circuit board 102. Actuation of one or more of the keys 18 causes a portion of the elastomeric layer 100 to distort and engage an actuator such as actuator 104, causing a keypad actuation. Such keypads are well-known in the art. Other types of keypads may be substituted for keypad 16 to provide functionality similar to keypad 16. A keypad such as keypad 16, employing an elastomeric layer such as elastomeric layer 100, provides the advantage of keeping dirt, moisture and other contaminants from circuit board 102 and other portions of the body housing 12 which may be damaged.

The switch 44 includes a switch actuator 106 disposed beneath a portion 108 of the elastomeric layer 100. When the flap housing 14 is rotated between the open position and the closed position, the actuator 96 of the second hinge pin 70 engages the portion 108 of the elastomeric layer 100, distorting the portion 108 to engage the switch actuator 106. Engagement of the switch actuator 106 operates the switch 44 to deactivate the handset 10 or otherwise place the handset 10 in a standby mode.

The hinge cover 23 serves to keep out dirt and other contaminants from the region of the switch 44. Also, the hinge cover 23 serves to make operation of the switch 44 invisible to the user of the handset 10. Moreover, the hinge cover 23 prevents interference with operation of the switch 44 by objects which may be inserted, jammed or otherwise placed between the flap housing 14 and the front housing portion 30.

Figure 7:
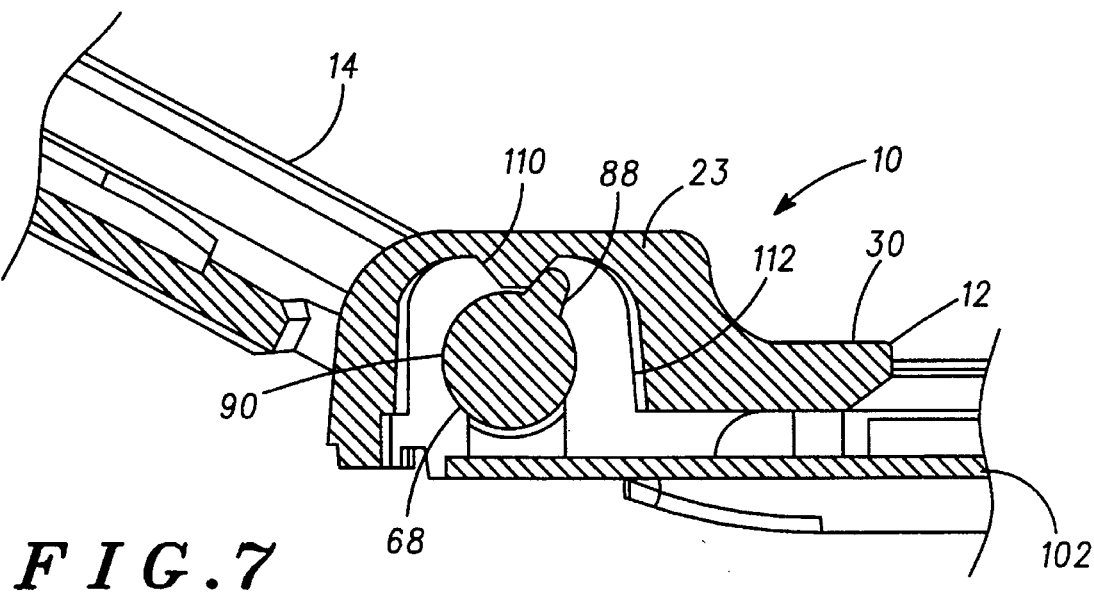
FIG. 7 is a cross-sectional view of the cordless radiotelephone handset of FIG. 1 with the flap housing in its open position.

FIG. 7 is a cross-sectional view of the cordless radiotelephone handset 10 of FIG. 1 with the flap housing 14 in its open position. In FIG. 7, the hinge cover 23 includes a detent stop 110 disposed on an interior surface 112 of the hinge cover 23. When the flap housing 14 is rotated to its open position, illustrated in FIG. 7, the detent catch 88 of the first hinge pin 68 engages the detent stop 110. The spring or other bias element (not shown) which engages the slot 86 (FIG. 4)

exerts a torsional force on the first hinge pin 68 to urge the detent catch 88 against the detent stop 110. Engagement of detent stop 110 by the detent catch 88 maintains the flap housing 14 in the open position at a predetermined orientation relative to the front housing portion 30.

As will be recognized by those ordinarily skilled in the art, the detent stop 110 may be located on other portions of the body housing 12, such as the front housing portion 30 or the circuit board 110. Detent stop 110 may be located on or integrally formed with any portion of the handset 110 which remains stationary with respect to rotation of the flap housing 14.

FIG. 8 is a perspective view of the cordless radiotelephone handset 10 of FIG. 1 in which a portion of the handset 10, including the hinge cover 23 has been removed to better illustrate aspects of the present invention. FIG. 7 generally shows a back or bottom view of the region where the flap housing 14 engages the front housing portion 30 of the body housing 12. As is shown in FIG. 8, the front housing portion 30 includes a retainer 114 comprising a first retainer 116 and a second retainer 118. The retainer 114 defines a hinge slot 120 including a first slot portion 122 defined by the first retainer 116 and a second slot portion 124 defined by the second retainer 118. More particularly, the first retainer 116 includes a first first retainer portion 126 and a second first retainer portion 128 defining the first slot portion 122 and the second retainer 118 includes a first second retainer portion 130 and a second second retainer portion 132 defining the second slot portion 124. While the retainer 114 illustrated in FIG. 8 as comprising two retainer segments, first retainer 116 and second retainer 118, it will be recognized that the retainer 114 may comprise a single retainer segment.

When assembled, the hinge pin 72, including first hinge pin 68 and second hinge pin 70, is disposed within the hinge slot 120. The hinge pin 72, including first hinge pin 68 and second hinge pin 70 is thus rotatable in the hinge slot 120, including first slot portion 122 and second slot portion 124, respectively. As will be understood by those skilled in the art, hinge slot 120 could consist of a single, continuous slot defined by retainer 114.

FIG. 9 is a cross-sectional view of the radiotelephone handset 10 of FIG. 1 taken through the line 8—8' in FIG. 8, showing the flap housing 14 in its open position. As is illustrated in FIG. 9, the hinge slot 120 has a substantially round cross-section having an inner diameter 134. As can further be seen in FIG. 9, the D-shaped portion 92 of the second hinge pin 70 is eccentric in cross-section and has a major axis and a minor axis. As can still further be seen in FIG. 9, the first second retainer portion 130 is spaced a predetermined distance from the second second retainer portion 132 to define a notch 140.

Preferably, the major axis 136 of the D-shaped portion 92 is sized to permit the D-shaped portion 92 to rotate within hinge slot 120. Further, preferably, the minor axis 138 of D-shaped portion 92 is sized to fit in the notch 140 while the major axis 136 of the D-shaped portion is sized too large to fit in the slot 140. In this manner, during assembly of the handset 10, the flap housing 14 may be joined to the front housing portion 30 by sliding the hinge pin 72 into the hinge slot 120 with the D-shaped portion 92 oriented so that the minor axis 138 fits in the notch 140. After the flap housing 14 and front housing portion 30 are joined, the flap housing 14 may be rotated approximately one-quarter turn so that the D-shaped portion 92 presents the major axis 136 to the notch 140, retaining the D-shaped portion within the retainer 114. In this manner, assembly of the radiotelephone handset 10 is simplified, making assembly more efficient by reducing the number of parts that must be assembled and the time required to assemble them.

From the foregoing, it can be seen that the present invention provides a foldable radiotelephone handset and flap housing therefore in which an actuator for the radiotelephone activation switch as well as a detent mechanism are integrated with the flap housing. The invention reduces parts count and simplifies manufacture of the radiotelephone. A hinge pin is shaped to permit one-way insertion of the hinge pin in a retainer further simplifying assembly.

While a particular embodiment of the present invention has been shown and described, modifications may be made, and it is therefore intended in the appended claims to cover all such changes and modifications which follow within the true spirit and scope of the invention.

What is claimed is:

1. A foldable radiotelephone, the radiotelephone operating in response to a switch, the radiotelephone comprising: a first housing including a front housing portion defining an aperture for exposing the switch, the first housing including a retainer defining a hinge slot, the first housing further including a detent stop; and a second housing including a body and a hinge pin integrally formed with the body, the hinge pin being disposed within the hinge slot, the hinge pin defining an axis, the second housing portion being rotatable about the axis, the hinge pin including a first actuator and a second actuator, the first actuator and the second actuator being integrally formed with the hinge pin, the first actuator being disposed proximate the switch to engage the switch when the second housing is rotated to a first position, the second actuator engaging the detent stop when the second housing is rotated to a second position.

2. A radiotelephone as recited in claim 1 wherein the hinge slot includes a first slot portion and a second slot portion and wherein the hinge pin includes a first hinge pin portion disposed within the first slot portion, the first hinge pin portion including the first actuator and wherein the hinge pin further includes a second hinge pin portion disposed within the second slot portion, the second hinge pin portion including the second actuator.

3. A radiotelephone as recited in claim 1 wherein the hinge slot is substantially circular in cross section with an inner diameter, and wherein the hinge pin is eccentric in cross section having a major axis and a minor axis, the length of the major axis being less than the inner diameter for rotation of the hinge pin within the hinge slot, and wherein the retainer includes a first retainer and a second retainer, the first retainer being spaced from the second retainer to define a notch having a width greater than the length of the minor axis and less than the length of the major axis.

4. A radiotelephone as recited in claim 3 wherein a part of the hinge pin is D-shaped in cross section.

5. A radiotelephone as recited in claim 4 wherein the hinge pin includes a first hinge pin portion and a second hinge pin portion.

6. A radiotelephone as defined in claim 3 wherein the first retainer comprises a first first retainer portion and a second first retainer portion and the second retainer comprises a first second retainer portion and a second second retainer portion, and wherein the first first retainer portion is spaced from the first second retainer portion to define a first hinge slot portion and the second first retainer portion is spaced from the second second retainer portion to define a second hinge slot portion.

7. A flap housing for a foldable telephone, the foldable telephone including a first housing having a front housing portion, the flap housing being rotatable about an axis between a first position and a second position with respect to the first housing, the foldable telephone being operable in response to a switch disposed on an inner surface of the front housing portion, the front housing portion having a front housing perimeter and a retainer defining a hinge slot aligned with the axis, the front housing portion further including an interior surface having a detent stop, the flap housing comprising:

- a body having a flap perimeter configured to engage the front housing perimeter when the flap housing is in the first position;
- a first hinge portion extending from the body, the first hinge portion formed to define a first hinge pin aligned with the axis and configured to engage a first portion of the hinge slot, the first hinge pin having a first actuator integrally formed with the first hinge pin, the first actuator being positioned to engage the switch when the flap housing is in the first position; and
- a second hinge portion, the second hinge portion formed to define a second hinge pin coaxial with the first hinge pin, the second hinge pin configured to engage a second portion of the hinge slot, the second hinge pin integrally formed with a second actuator extending from the second hinge pin, the second actuator being positioned to engage the detent stop when the flap housing is in the second position; the body, the first hinge portion and the second hinge portion being integrally formed.

8. A flap housing for a foldable telephone as recited in claim 7 wherein the second actuator comprises a cam shaped segment of the second hinge pin.

9. A flap housing for a foldable telephone as recited in claim 8 wherein the retainer includes a first retainer portion and a second retainer portion, the first retainer portion being spaced from the second retainer portion, and wherein the hinge slot is substantially round in cross section, and wherein the first hinge pin includes a first segment having an eccentric cross section and the second hinge pin includes a second segment having an eccentric cross section, each respective hinge pin eccentric cross section being sized to rotate in the hinge slot, each respective hinge pin eccentric cross section being further sized to fit between the first retainer portion and the second retainer portion in a first rotational orientation and not to fit between the first retainer portion and the second retainer portion in a second rotational orientation.

10. A flap housing for a foldable telephone as recited in claim 9 wherein the first retainer portion is spaced a predetermined distance from the second retainer portion and wherein each respective hinge pin eccentric cross section has a major axis and a minor axis and wherein the length of the major axis is greater than the predetermined distance and the length of the minor axis is less than the predetermined distance.

* * * * *